United States Patent [19]

Murphy et al.

[11] Patent Number: 5,282,157
[45] Date of Patent: Jan. 25, 1994

[54] INPUT IMPEDANCE DERIVED FROM A TRANSFER NETWORK

[75] Inventors: James Murphy, Long Branch; Steven T. Moore, Neptune, both of N.J.

[73] Assignee: Telecom Analysis Systems, Inc., Eatontown, N.J.

[21] Appl. No.: 581,774

[22] Filed: Sep. 13, 1990

[51] Int. Cl.$^5$ .................................. H04M 1/00
[52] U.S. Cl. ........................ 364/802; 379/345; 379/402
[58] Field of Search ........... 364/802; 379/398, 344, 379/345, 395, 405, 402, 385; 330/53; 375/12; 370/32.1, 32

[56] References Cited

U.S. PATENT DOCUMENTS

| | | | |
|---|---|---|---|
| 3,428,755 | 2/1969 | Draper, Jr. et al. | 179/84 |
| 3,882,276 | 5/1975 | Feiner et al. | 179/1 |
| 3,909,559 | 9/1975 | Taylor | 379/405 |
| 3,911,372 | 10/1975 | Seidel | 330/53 |
| 3,934,099 | 1/1976 | Elder, Jr. | 379/405 |
| 3,973,087 | 8/1976 | Puckette | 379/395 |
| 4,002,852 | 1/1977 | Martin | 379/395 |
| 4,004,102 | 1/1977 | Ott | 179/16 |
| 4,056,688 | 11/1977 | Stiefel | 179/16 |
| 4,064,377 | 12/1977 | Regan | 379/385 |
| 4,074,087 | 2/1978 | Blake, Jr et al. | 179/170 |
| 4,146,753 | 3/1979 | D'Arrigo et al. | 379/395 |
| 4,331,842 | 5/1982 | Kiko | 379/398 |
| 4,351,060 | 9/1982 | Treiber | 375/12 |
| 4,357,494 | 11/1982 | Chambers, Jr. | 379/398 |
| 4,378,472 | 3/1983 | Lechner | 370/32 |
| 4,380,690 | 4/1983 | Matsufuji et al. | 379/402 |
| 4,381,561 | 4/1983 | Treiber | 370/24 |
| 4,395,599 | 7/1983 | Seidel | 170/170 |
| 4,535,206 | 8/1985 | Falconer | 179/170.2 |
| 4,538,032 | 8/1985 | Ballatore et al. | 179/170 |
| 4,621,172 | 11/1986 | Kanemasa et al. | 370/32.1 |
| 4,899,382 | 2/1990 | Gartner | 379/398 |
| 4,961,219 | 10/1990 | Patel | 379/398 |
| 5,131,028 | 7/1992 | Chambers | 379/344 |

Primary Examiner—Jerry Smith
Assistant Examiner—Jim Trammell
Attorney, Agent, or Firm—Peter L. Michaelson; Raymond R. Moser, Jr.

[57] ABSTRACT

Circuitry for transforming a transfer function characteristic into a specified input impedance includes: a hybrid arrangement having input, transmit, receive and balance ports; and a two-port network connected from the transmit to receive ports of the hybrid. The relation between the input impedance at the input port to the network transfer function is expressible as a function of the actual impedance seen looking into the two-wire input port of the hybrid, and the desired impedance to be simulated.

5 Claims, 5 Drawing Sheets

INPUT IMPEDANCE DERIVED FROM A TRANSFER NETWORK

FIELD OF THE INVENTION

This invention relates generally to circuitry for providing a preselected driving point impedance and, more particularly, to frequency-sensitive driving point impedance circuitry implementable with a wideband transfer network.

BACKGROUND OF THE INVENTION

The transmission of digital data in both public and private networks relies upon the use of data modems. Modems are modulators/demodulators designed for transmission of incoming data streams over analog facilities such as a conventional voice frequency (vf) (300–3400 Hz) telephone channel. Modems were devised because it was more economical to use the existing analog telephone network rather than constructing new separate digital transmission networks.

A voice frequency telephone connection through the public switched telephone network contains two-wire segments, known as subscriber loops, which connect the sending and receiving stations to their respective end offices. Connection between end offices are made via the network's trunk lines, which may transport signals using analog baseband, analog modulated carrier, digital carrier, or other technologies.

While the loop carries both directions of communication on one pair of wires, the trunks connecting the end offices typically send each transmission direction over a separate pair of wires. This is known as four-wire transmission.

Two-wire loops are connected to the four-wire transmission circuits at the end office through devices called hybrids. A hybrid is a four-port device used to separate signals travelling in both directions along a single pair of wires into individual directions, and to recombine those signals travelling on four-wire circuits for use on two-wire loops.

A conventional telephone hybrid has transmit and receive paths connected to two of the ports, the loop to the third port, and a so-called balance network connected to the fourth port. If the impedance of the balance network is equal to the input impedance of the loop over the frequency range of the signals, then the transmit and receive ports are conjugate ports, that is, these ports are decoupled, and a signal transmitted into the loop will not appear at the modem's own receiver. A measure of how well the hybrid isolates the transmit and receive ports is the transhybrid loss. An ideal hybrid would have an infinite transhybrid loss.

However, in practice, the balance network does not equal the input impedance because of the numerous make-ups in the loop plant. These loops vary because of cable gauge, length, termination, and operating conditions such as temperature. Since these variations are not predictable on a loop-by-loop basis, the usual solution is to select a compromise balance network that, on average, will minimize the "leakage" across the transmit (T) and receive (R) ports or maximize the trans-hybrid loss.

The choice of a compromise balance network depends on the balance technique for the end office. Standard balance is 900 ohms resistance in series with 2.16 $\mu$F capacitance. If the loop plant at the end office is segregated into loaded and non-loaded loops, separate networks can be used. For loaded loops, a compromise balance circuit contains a branch containing 100 ohms resistance in series with 5000 pF capacitance in parallel with a branch containing 1650 ohms resistance. Non-loaded loops require a compromise balance circuit of a branch containing 100 ohms resistance in series with 0.05 $\mu$F capacitance in parallel with a branch containing 800 ohms resistance.

When a transmission line, such as the two-wire subscriber loop, with characteristic impedance $Z_0$, is terminated in an impedance $Z_t$, such as the input impedance of the end office hybrid, which is other than $Z_0$, part of the signal incident to that termination will be reflected back to the driving point. This phenomena is known as end office reflected echo. It has a profound effect on data transmission in telephone networks.

A voice-band data modem generally has separate internal transmit and receive paths which are combined to effect communication over the two-wire loops. A data source in a near-end modem generates data signals for transmission to a far-end modem, whereas an independent data source in the far-end modem propagates data signals which serve as the receive data signals for the near-end modem. Generally a hybrid is used to couple the independent transmit and receive sections of a modem to the loop.

Leakage from the T port to the R port due to the mismatch between the modem's balance network and the loop input impedance leads to a so-called network interface echo condition in a modem wherein an attenuated portion of the transmit data signal interferes with the incoming received data signal.

Both the network interface echo and the end office echo cause errors in the detected data signal; in general, the larger the echo, the greater the error rate. The severity of both of these echoes is a function of the degree of mismatch between the modem's balance network ($Z_{bm}$) and the input impedance of the loop ($Z_{IN}$). To test modem performance in a laboratory setting, especially the response of a modem to an echo condition, a testing arrangement is required whereby various mismatch conditions representative of those which occur in an actual field setting may be conveniently simulated.

Such a requirement basically translates into the ability to simulate the input impedance or driving point impedance of various loop make-ups. Conventionally, so-called artificial cable elements have been devised that facilitate simulation of numerous loop make-ups. The components of the kit are lumped element representations of various gauges and lengths of distributed transmission lines. Each component provides a reasonable estimate to the behavior of the particular gauge and length of line being simulated over the voice frequency range. Different make-ups are simulated by plugging together the components having fixed lengths to achieve the desired length. However, cable kit elements merely serve to replace a distributed line in the sense that the kit has input and output ports which replicate the input and output ports of the line.

The major drawback associated with the artificial cable method of simulation of input impedance is the fact that it introduces effects due to cable parameters other than the impedance. What is needed is a method of impedance synthesis that is able to fully exercise the modem circuitry, is free of unwanted effects, and allows the conditions of the test to be fully controlled.

SUMMARY OF THE INVENTION

These limitations of the prior art as well as other shortcomings and deficiencies are obviated, in accordance with the present invention, by circuitry which synthesizes an input impedance $Z_{IN}$ independent of other cable parameters using elements which are fully controlled.

Broadly, an input impedance is synthesized using a hybrid arrangement having four ports, including input, balance, transmit, and receive ports, to couple a network having a complex transfer function from the transmit-to-receive ports. The transfer function is determined directly from a relation involving the required input impedance, and the actual terminating impedance of the input port. Once determined, the transfer function is synthesized and components corresponding to the synthesized transfer function are selected to realize the interposed network effecting the given input impedance.

The hybrid may be realized in any form: passive, electronic, or digital. Also, the transfer network may be implemented in any form: passive, electronic or digital.

One advantage of the arrangement for generating the desired input impedance in accordance with the present invention is that the arrangement may be easily automated. Only certain component values need to be changed, such as by switching in components having these values in an electronic filter, or by loading a new set of digital filter coefficients, to simulate various loop make-ups.

BRIEF DESCRIPTION OF THE DRAWINGS

The principles of the present invention will be clearly understood by considering the following detailed description in conjunction with the accompanying drawings, in which.

To facilitate understanding, identical reference numerals have been used, where appropriate, to designate identical elements that are common to the figures.

DETAILED DESCRIPTION

Figure 1:
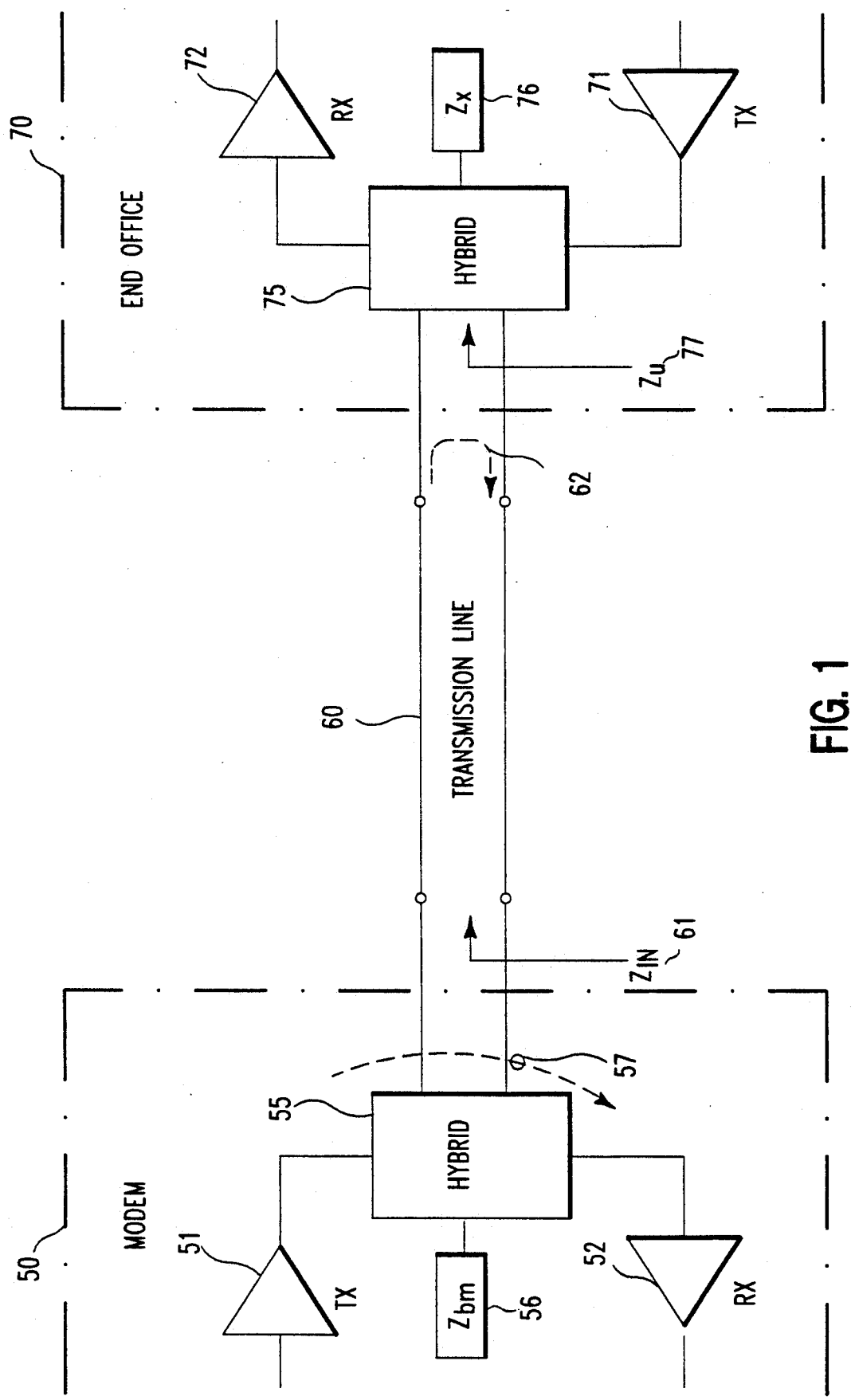
FIG. 1 is a block diagram illustrating a transmission line coupling a modem to an end office as introduced in the background section.

By way of reviewing the concepts and terminology introduced in the Background Section in order to elucidate the embodiments in accordance with the present invention, reference is made to FIG. 1. As depicted, transmission line 60 is shown as interconnecting modem 50 with end office 70. Modem 50 is composed of hybrid 55, which couples transmitter 51 and receiver 52 to transmission line 60. Hybrid 55 also has balance network 56 coupled to its balance port. If the input impedance $Z_{IN}$ to line 60 (shown by indicia 61) and impedance $Z_{bm}$ of network 56 are not equal, then a portion of the transmitted signal from transmitter 51 couples to receiver 52 resulting in network interface echo; this path is shown by dashed line 57. In addition, if line 60 is not terminated in its characteristic impedance $Z_o$, then end office echo can also occur on dashed path 62. In fact, the impedance terminating line 60 is the equivalent input impedance $Z_u$ (element 77) of office 70 and, normally, $Z_o$ and $Z_u$ are mismatched, thereby leading to reflected echo. Office 70 is typically composed of hybrid 75, which couples line 60 to receiver 72 and transmitter 71 on the four-wire side of office 70. Hybrid 75 has balance network $Z_x$ (element 76) coupled to its balance port.

As an aid in understanding the theory and motivation underlying the present invention, it is helpful to first consider certain relations from the transmission line art. It is well-established in such art that the termination impedance of a transmission line, designated $Z_{term}$, and the characteristic impedance of the line, called $Z_0$, may be combined to yield a quantity designated the complex reflection coefficient p, wherein p is given by the following transformation identified as equation [1]:

$$p = \frac{Z_{term} - Z_0}{Z_{term} + Z_0}. \quad [1]$$

(Note that p, $Z_{term}$, and $Z_0$ are all functions of the complex radian frequency variable s. The s has been suppressed for ease of presentation.) The magnitude of the coefficient p is a measure of the voltage reflected from impedance mismatches along the transmission line at each individual frequency.

Using the concept of the reflection coefficient, for any hybrid, we can derive a relation that will demonstrate how the unmodified input impedance $Z_u$ of the end office hybrid may be manipulated into a desired impedance $Z_{IN}$.

We seek to derive a function H(s) by which a signal received at the input port of the hybrid can be filtered and re-transmitted from the transmit port to the receive port, that will result in the input impedance of the hybrid $Z_u$ being made to look like a given impedance $Z_{IN}$.

Figure 2:
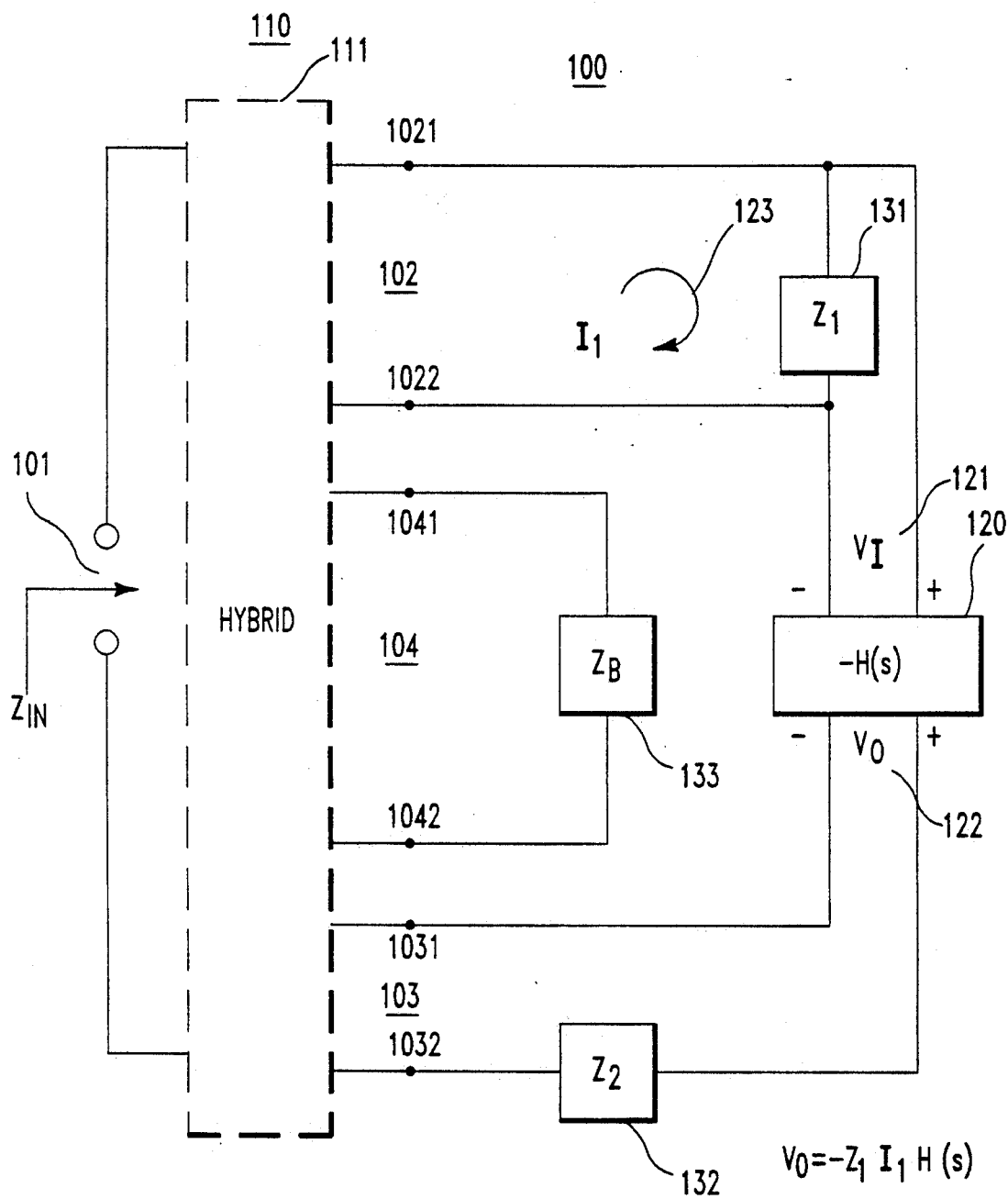
FIG. 2 is a hybrid arrangement to generate the input impedance from the transfer function network.

We begin by calculating the effective input impedance of a hybrid which has a feedback path from transmit port to receive port such as that shown in FIG. 2. The voltage across the input port has two components due to 1) the driving source voltage, and 2) to that part of the received voltage which is returned through the feedback path. In FIG. 2, if a source drives port 101, V+ is the voltage developed across port 101 due to the unmodified input impedance $Z_u$ of the hybrid, and V− is the voltage developed due to the feedback of the received signal via transfer network 120, i.e. H(s).

Defining f as that part of the received signal that is fed back results in a relation between the unmodified input impedance and the effective impedance $Z_{IN}$:

$$Z_{IN} = Z_u \frac{(1 + f)}{(1 - f)} \quad [2]$$

Then solving for f:

$$f = \frac{Z_{IN} - Z_u}{Z_{IN} + Z_u} = H(s), \quad [3]$$

where H(s) is the function of the complex frequency variable s that will be used to synthesize $Z_{IN}$.

The objective of the following analysis is to illustrate that the input impedance at port 101 of the hybrid arrangement shown in FIG. 2 yields the desired impedance $Z_{IN}$ in the form of equation [2]. The diagram of FIG. 3 indicates the manner in which circuitry 100 may be embedded in an actual four-wire circuit. As indicated, the four-wire transmit signal may be supplied via port 201, and the four-wire receive signal is connected to port 202. A detailed illustrative implementation for circuit 100 of FIG. 3 will be discussed later.

Figure 4:
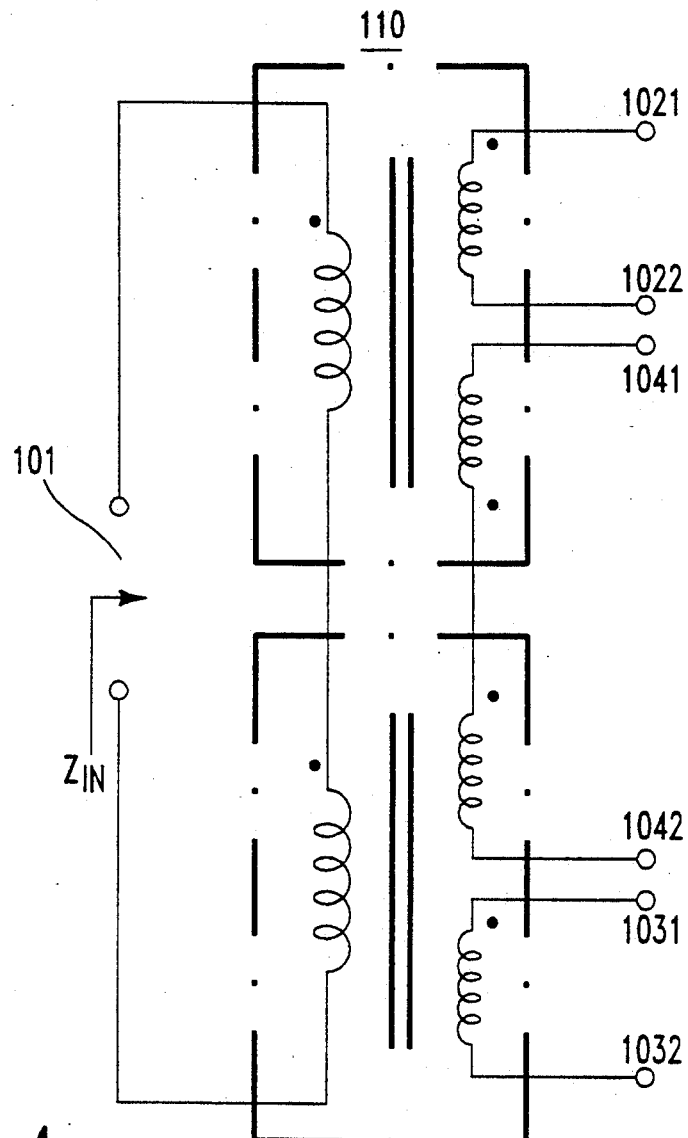
FIG. 4 a two-transformer realization of a hybrid.

Circuit 100 of FIG. 2 is composed of hybrid arrangement 110 and transfer network 120 coupled to hybrid 110. Hybrid 110 has four external ports, namely, 101–104. The desired input impedance $Z_{IN}$ appears at port 101. Port 102, comprising nodes 1021, 1022, is terminated by impedance 131 having a nominal value designated $Z_1$ which, when added to impedance 132, determines the unmodified input impedance $Z_u$; this port is referred to as the transmit (T) port. Voltage $V_I$, having reference numeral 121, is developed across impedance 131 and serves as the input to network 120. Voltage $V_O$ having reference numeral 122, is the output voltage from network 120. H(s) for this illustrative embodiment is given by $-V_O/V_I$. Voltage $V_O$ in series with impedance 132 drives port 103 (nodes 1031, 1032); impedance 132 determines the output impedance of the hybrid and has a nominal value designated $Z_2$. Port 103 is referred to as the receive (R) port. Finally, port 104 (nodes 1041, 1042) is coupled to hybrid balance impedance 133 having a value $Z_b$; this port is the balance network port. The two-transformer arrangement depicted in FIG. 4 is exemplary of hybrid 110.

The focus now is to show how H(s) is computed from $Z_{IN}$ and $Z_u$ and, in turn, to illustrate how to synthesize a network transfer function to generate the given $Z_{IN}$ at port 101 of circuit 100.

SYNTHESIS EXAMPLE

Figure 5:
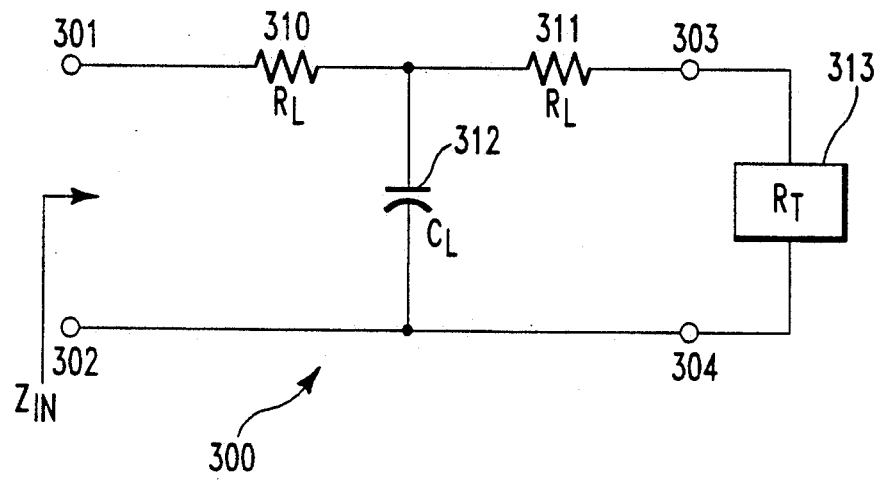
FIG. 5 depicts an RC model for a transmission line utilized to compute transfer network H(s)

For illustrative purposes, it is assumed that a simple RC model for a distributed transmission line applies over the frequency range of interest, namely, the voice band from 300–3400 Hz. Circuit model 300 of FIG. 5 depicts a lumped element model for a given gauge and length of cable with a given termination ($R_T$) which may or may not be equal to the terminating impedance ($Z_u$) of the actual hybrid; $R_L$ (elements 310 and 311) is representative of the total distributed resistance ($R_{tot}$) divided by two. $C_L$ (element 312) is representative of the entire distributed capacitance. Resistance $R_T$ (element 313) terminates line 300 across far-end nodes 303 and 304. The driving point impedance $Z_{IN}$ is developed across input nodes 301 and 302.

Circuit model 300 of FIG. 5 is only one of several lumped element models which may be used to represent a system with distributed parameters such as the terminated transmission line of this example. The model was chosen over a model comprised of a single $R_{tot}$ and $C_L$ to be symmetrical when inspected from the left or the right, and a balanced model with four lumped resistances each equal to $R_{tot}/4$ to make the calculations of this illustrative example less tedious.

As an example, 2000 feet of 26 gauge cable at 70 degrees F. (approximately 21.1 degrees C.) is modeled; such a cable has a distributed resistance of 441 ohms/mile and a distributed capacitance of 0.083 microfarads per mile. Accordingly, $R_L$ is set to 83.5 ohms and $C_L$ is 0.0314 microfarads. Resistance $R_T$ (313), the terminating impedance of the modeled loop is selected to be 900 ohms. In algebraic terms, it may be demonstrated that the input port impedance may be written as $$Z_{IN} = \frac{sC_L R_L (R_L + R_T) + 2R_L + R_T}{sC_L (R_L + R_T) + 1}, \quad [4]$$

where s is the complex frequency variable.

The unmodified input impedance of the hybrid, $Z_u$, is chosen to be 900 ohms for this example, though it can be any value, independent of $R_T$. To calculate H(s), equation [4] is combined with equation [3] and reduced to minimal form to yield:

$$H(s) = \frac{sC_L(R_L + R_T)(R_L - Z_u) + 2R_L + R_T - Z_u}{sC_L(R_L + R_T)(R_L + Z_u) + 2R_L + R_T + Z_u}. \quad [5]$$

To complete the example, numerical values are substituted into equation [5]; it is recalled that:
$C_L = 0.0318$ microfarads
$R_L = 83.5$ ohms
$R_T = 900$ ohms
$Z_u = 900$ ohms.
Inserting these values into equation [5] results in $$H(s) = \frac{167 - .025536s}{1967 + .030759s}. \quad [6]$$

Figure 3:
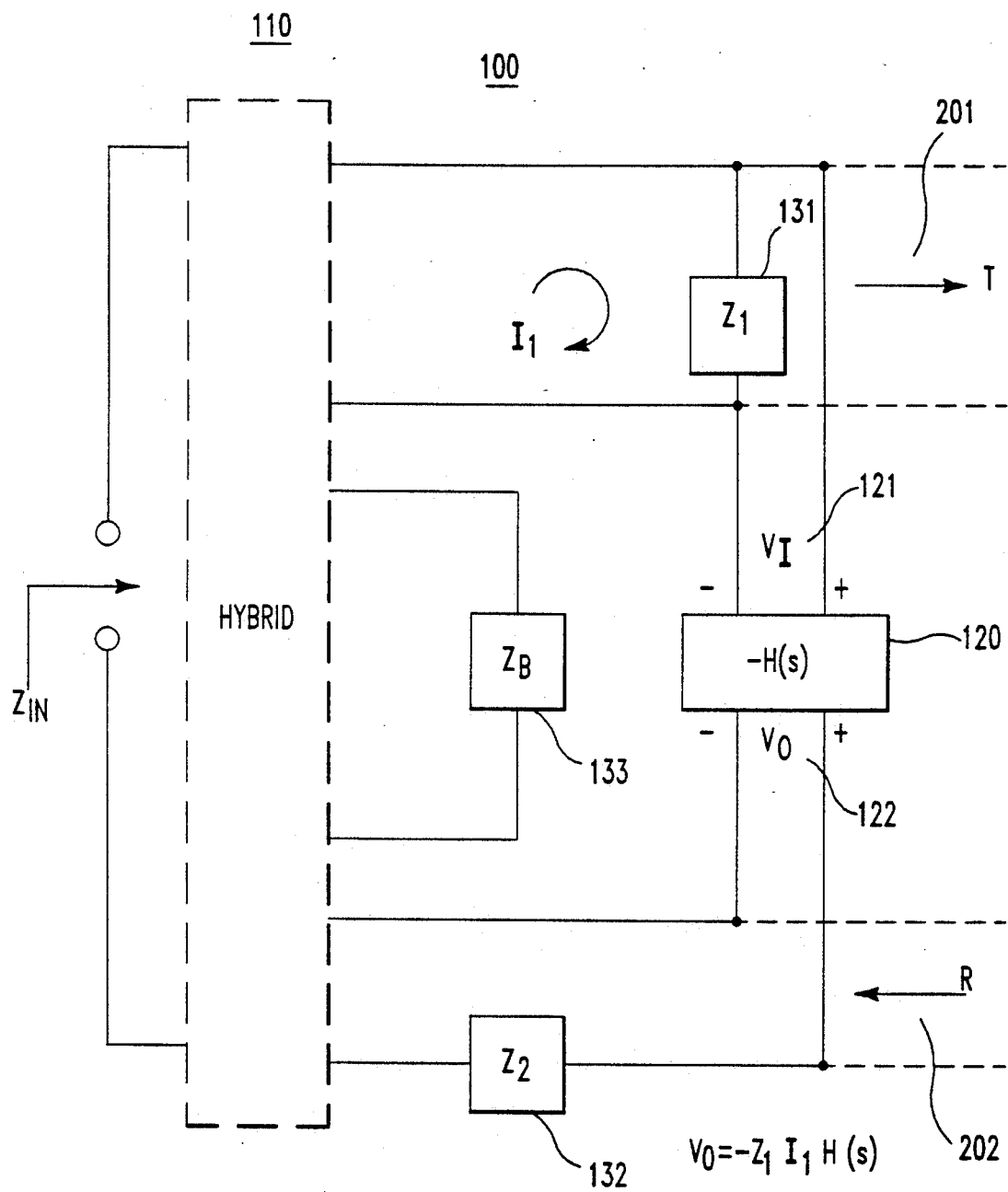
FIG. 3 shows the arrangement of FIG. 2 with the four-wire transmit and receive paths superimposed.
Figure 6:
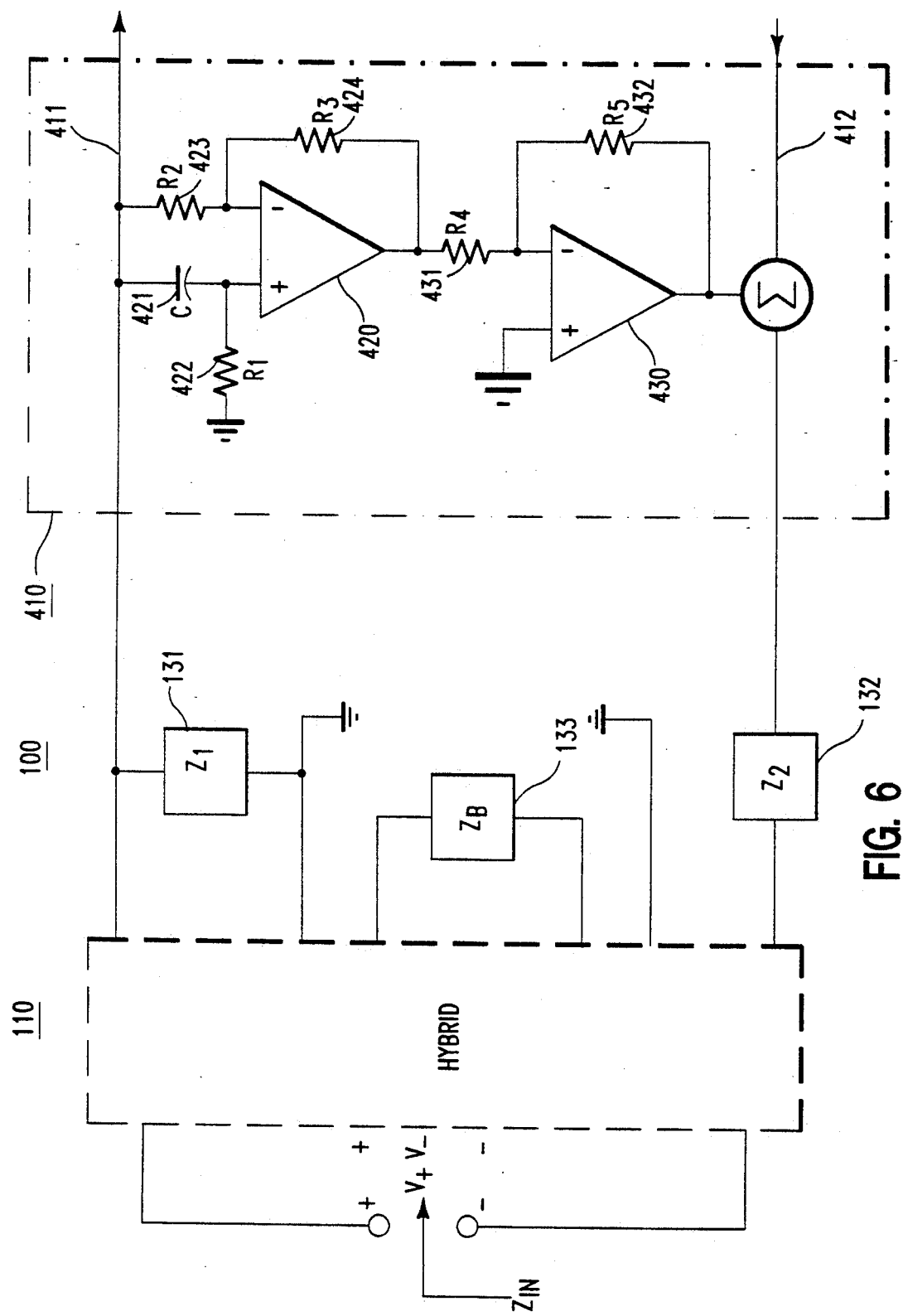
FIG. 6 shows an illustrative embodiment of circuitry to realize desired input impedance.

An analog circuit to synthesize equation [6] is shown by block 410 of circuit 100 in FIG. 6; circuit 410 shows exemplary circuitry which is substituted for block 120 shown in the right-most portion of FIG. 3. Leads 411 and carry the transmit and receive signals, respectively, and these four-wire leads may be treated as any other in the trunk plant. Operational amplifier 420 with its associated components 421–424, and operational amplifier 430 with its associated components 431–432, realize the pole-zero pair and gain, respectively, required of transfer function H(s). Component values for network 410 to provide the input impedance $Z_{IN}$ of 2000 feet of cable at 70 degrees F. are as indicated below:
$CR_1 = 15.6375 \cdot 10^{31} 6$,
$R_3 = 0.102266 R_2$ and
$R_5 = 0.8302 R_4$.
To solve for these values
Let $C = 1000$ pF,
$R_1 = 15.64$K ohms,
Let $R_2 = 10$K ohms,
$R_3 = 1.023$K ohms,
Let $R_4 = 10$K ohms; and
$R_5 = 8.302$K ohms.

This synthesis example is indicative of the general procedure for generating and synthesizing H(s) for more complex loop make-ups, that is, loops giving rise to a transfer function H(s) which is expressible by a number of pole-zero pairs. Each pole-zero pair may then be realized by a single stage in a cascade of operational amplifier stages.

Although transfer network 120 has been described in terms of a network comprising only analog components, it is apparent that digital techniques may be employed to generate the desired H(s). For instance, the analog signal appearing at the input to H(s) may be converted to a digital signal using an A/D converter, then this converted signal may be processed digitally to produce a digital filter signal representative of the desired transfer function, and finally a D/A converter would convert the filtered signal to the requisite analog signal at the output of the H(s) transfer network.

Thus, it is to be further understood that the methodology described herein is not limited to specific forms by way of illustration, but may assume other embodiments limited only by the scope of the appended claims.

What is claimed is:

1. In data communications test equipment, circuitry for synthesizing a given input impedance $Z_{IN}$ from a preselected terminating impedance $Z_u$, said circuitry comprising:

a hybrid circuit having an input port for connecting a modem, a transmit port, a receive port and a balance port, a transfer network connected from said transmit port to said receive port, said network having a transfer function $$H = \frac{Z_{IN} - Z_u}{Z_{IN} + Z_u}, \text{ and}$$

wherein the input impedance is developed across said input port synthesizes an input impedance $Z_{IN}$ of a transmission line that is terminated with said preselected terminating impedance $Z_u$, and said input impedance is of the form:

$$Z_{IN} = \frac{Z_u(1-H)}{1+H}.$$

2. The circuitry as recited in claim 1 wherein said transfer function is expressible in terms of pole-zero pairs and said transfer function includes a cascade of buffer stages, each of said stages realizing distinct pole-zero pairs in correspondence to a distinct pole-zero pair of said transfer function.

3. In data communications test equipment, circuitry for synthesizing a given input impedance $Z_{IN}$ from a preselected terminating impedance $Z_u$, said circuitry comprising: p1 a hybrid circuit having an input port for connecting a modem, a balance port, a transmit port and a receive port, and a two-port network connected from said transmit port to said receive port, said network having a voltage transfer function designed H:

$$H = \frac{Z_{IN} - Z_U}{Z_{IN} + Z_U},$$

so that the given input impedance is developed across said input port synthesizes an input impedance $Z_{IN}$ of a transmission line that is terminated with said preselected terminating impedance $Z_u$, and said input impedance is of the form:

$$Z_{IN} = \frac{Z_U(1-H)}{1+H}.$$

4. The circuitry as recited in claim 3 wherein said network transfer function is expressible in terms of pole-zero pairs and said network includes a cascade of buffer stages, each of said stages realizing distinct pole-zero pairs in correspondence to a distinct pole-zero pair of said transfer function.

5. The circuitry as recited in claim 3 further including a summation circuit, interposed between an output of said transfer network and said receive port, for summing said output of said network and a four-wire transmission signal feeding said summation circuit.

* * * * *